United States Patent
Friedman

(10) Patent No.: US 7,120,517 B2
(45) Date of Patent: Oct. 10, 2006

(54) INTEGRATION ASSISTING SYSTEM AND METHOD

(76) Inventor: Avraham Friedman, Moshav Udim, Moshav Udim, 42905 (IL)

( * ) Notice: Subject to any disclaimer, the term of this patent is extended or adjusted under 35 U.S.C. 154(b) by 177 days.

(21) Appl. No.: 10/250,549

(22) PCT Filed: Jan. 2, 2001

(86) PCT No.: PCT/IL01/00007

§ 371 (c)(1),
(2), (4) Date: Jul. 1, 2003

(87) PCT Pub. No.: WO02/054160

PCT Pub. Date: Jul. 11, 2002

(65) Prior Publication Data

US 2005/0033477 A1    Feb. 10, 2005

(51) Int. Cl.
*G06F 19/00*    (2006.01)
(52) U.S. Cl. .................. 700/245; 700/250; 700/264; 318/568.12
(58) Field of Classification Search ................ 700/245, 700/250, 264; 318/568.12
See application file for complete search history.

(56) References Cited

U.S. PATENT DOCUMENTS

| | | | |
|---|---|---|---|
| 4,541,770 A | 9/1985 | Niinomi et al. | |
| 4,868,474 A | 9/1989 | Lancraft et al. | |
| 4,953,075 A | 8/1990 | Nau et al. | |
| 5,029,065 A | 7/1991 | Nau et al. | |
| 5,293,107 A | 3/1994 | Akeel | |
| 5,428,470 A | 6/1995 | Labriola, II | |
| 5,581,166 A | 12/1996 | Eismann et al. | |
| 5,844,145 A | 12/1998 | D'Angelo | |
| 5,914,876 A | 6/1999 | Hirai | |
| 5,963,712 A | 10/1999 | Fujita et al. | |
| 5,995,882 A | 11/1999 | Patterson et al. | |
| 6,182,203 B1 | 1/2001 | Simar, Jr. et al. | |
| 6,493,293 B1* | 12/2002 | Gallery et al. | 369/30.27 |
| 2004/0083452 A1* | 4/2004 | Minor et al. | 717/109 |

FOREIGN PATENT DOCUMENTS

| | | |
|---|---|---|
| WO | WO 99/03055 | 1/1999 |
| WO | WO 99/03133 | 1/1999 |

OTHER PUBLICATIONS

Thrum et al., Probabilistic algorithms and the interactive museum tour-guide robot Minerva, 2000, Internet, p. 1-34.*
Janet et al., Autonomous mobile robot global self-localization using kohonen adn reion-featue neural networks, 1997, Internet, p. 263-282.*
Beetz et al., Integrated, plan-based control of autonomous robots in human environments, 2001, Internet p. 2-11.*
Kami-ike et al., Characteristics of an ultra-small biomotor, 1991, IEEE, pp. 245-246.*
Iwashina et al., Develpment of in-pipe operation micro robots, 1994, IEEE, pp. 41-45.*

* cited by examiner

*Primary Examiner*—Thomas G. Black
*Assistant Examiner*—McDieunel Marc
(74) *Attorney, Agent, or Firm*—Fenster & Company

(57) ABSTRACT

A self-intelligent component-based robotics system wherein at (202), system (100) is assembled. At (204) an optimal self configuration process is performed. At (206) a user inputs into the system a "system image" which represents one or more functions expected from the system. At (208) calibration is performed. Once calibration is completed, system 100 is being used at (210).

11 Claims, 2 Drawing Sheets

INTEGRATION ASSISTING SYSTEM AND METHOD

RELATED APPLICATIONS

The present application is a U.S. national application of PCT Application No. PCT/IL01/00007, filed on Jan. 2, 2001.

FIELD OF THE INVENTION

The present invention relates to the field of system integration, for example for motor control systems.

BACKGROUND

Robotics systems in general and especially motor drive systems, typically require a high level of manual integration. For example, in many robotics systems, wires are connected by hand between screw connectors on control units and on motor units. After the wiring is completed, typically by a skilled robotics electrician, a calibration and testing phase, for checking that the wiring is correctly connected, is performed.

Generally, for field installation, a complete team including not only an electrician, but also a skilled integrator, is required. One reason for this need is the wide variety of sensors and actuators which may be used. As a result, even if an attempt is made to use standard cables, there is usually no avoiding the use of dedicated wiring, attached to components using screws and the like.

In an alternative scheme, the robotics system is assembled and tested at the factory, then disassembled for transport, so substantially no complex wiring, calibration and testing is required in the field, but field modification is close to impossible.

SUMMARY OF THE INVENTION

An aspect of some embodiments of the invention is a methodology for assisting in robotics system integration, in which, a robotics system is assembled from components in one of a myriad of configurations, and only limited integration ability is required to produce a working system. In some particular embodiments of the invention, the system compensates for a lack of integration experience on the part of the integrator. In some embodiments of the invention, the system self-integrates. Alternatively or additionally, the system prompts the integrator to run certain tests and/or make certain adjustments. Alternatively or additionally, the system self-diagnoses. Optionally, the cable connectors are plugs, optionally with flexible pin assignment ability, for example to allow automatic pin assignment. Alternatively or additionally, an integrator informs the system of its desired operational behavior, to assist in the self-integration. In an exemplary embodiment of the invention, the result is that no dedicated wiring is required. Optionally, the pin assignment can change automatically when the function of the system changes.

An aspect of some embodiments of the invention relates to providing a part information database with each component of a robotics system, and a set of components having such information, for use in an integrating-assisting system. One potential advantage is that a system constructed from such components, can be integrated with little or no specialized knowledge of the components. Another potential advantage is that the expertise lies in the system, not in any particular integrator, so later modification and/or debugging of the system is easier. Exemplary components include motors, other actuators, control elements and sensors. The database may be provided, for example, on an attachment to the component or on a part that is integral to the component. Alternatively, the parts or attachments include a serial number or other codes. Information for the particular element is retrieved, based on the coded information, from a central repository, for example the system controller or an Internet. Possibly, other programming, parameters and/or operational data may also be retrieved from such repositories. Although the information is preferably complete, in some embodiments of the invention, the information is limited to a particular set of values required for a system that is to be constructed of the components. Thus, the components or the central repository may be programmed for particular system configurations, while still supporting some future modification.

An aspect of some embodiments of the invention relates to a set of robotics components, each component including means for providing the component integration information. In an exemplary embodiment of the invention, the set is packaged with a software (possibly on a controller) for configuring a robotics system using such components. In an exemplary embodiment of the invention, the software requires little or no user input. In particular, expert user input is preferably avoided. In some cases however, some expert information may be required, and possibly provided by telephone or computer network.

An aspect of some embodiments of the invention relates to a robotics system that detects, configures and/or test its components, for example when turned on and/or periodically.

An aspect of some embodiments of the invention, relates to an intelligent system management software that can assist in anticipating problems in activating the system and/or in diagnosing and/or solving such problems once they appear. In an exemplary embodiment of the invention, the software rejects commands and/or configurations that are likely to fail and/or provide unreasonable wear.

Alternatively or additionally, the system management software can assist in expansion and/or upgrading of the system. In an exemplary embodiment of the invention, the system suggests upgrades that are suitable for the standard use of the system. Alternatively or additionally, the system translates non-technical specifications entered by a user into a list of suggested replacement parts.

An aspect of some embodiments of the invention relates to a converter box for coupling together motors having normally open limit switches and normally closed limit switches. In an exemplary embodiment of the invention, the converter box is connected between a power circuit and the limit switch (and motor). The cable between the converter box and the limit switch preferably includes a signal that indicates the type of limit switch, so the converter box can deal with it accordingly.

There is thus provided in accordance with an exemplary embodiment of the invention, a method of robotics integration, comprising:

assembling a robotics system from components including at least one motor having a rotation direction;

generating a prompt to a user regarding said rotation direction; and entering by the user of at least one of an indication of a desired rotation direction and an indication of an actual rotation direction of said motor into said system, in response to said prompt. Optionally, said prompt is included in a self test by said system. Alternatively or additionally, the method comprises self-configuring of said system in response to said response. Alternatively or additionally, the method comprises repeating said prompting and said entering, to perform an interactive system integration process. Alternatively or additionally, generating a prompt comprises consulting a database responsive to said assembly of said system to generate said prompt.

In an exemplary embodiment of the invention, the method comprises consulting a database responsive to said response, as an input for a self configuration process.

There is also provided in accordance with an exemplary embodiment of the invention, a self-predicting system, comprising:

a plurality of robotics components;

a memory storing therein a system configuration map; and an input for a command to the system; and a controller that receives at least one command from said input and that analyzes said command in view of said map, to predict a possible failure mode of the robotics system. Optionally, said controller determines said failure mode based on at least one of initial speed, final speed and acceleration of at least one of said components. Alternatively or additionally, said controller comprises a database of failure scenarios and wherein said controller utilizes said database for said analysis. Alternatively or additionally, said controller comprises a database of experience, learned by said controller in the use of said system and wherein said controller utilizes said database for said prediction. Alternatively or additionally, said controller is a centralized component. Alternatively, said controller comprises a plurality of controller component distributed between at least some of said components.

There is also provided in accordance with an exemplary embodiment of the invention, an expanding system, comprising:

a plurality of robotics components assembled into a working system;

a database including candidate additional system components; and a controller that analyzes said database and generates a suggestion to a user of said system, of an upgrade of the system. Optionally, said upgrade comprises a replacement of a component already in said working system. Alternatively or additionally, said upgrade comprises adding an additional component to said system. Alternatively or additionally, said controller generates said suggestion in response to a system failure. Alternatively or additionally, the system comprises an input that receives a user system specification and wherein said controller generates said suggestion in response to a system specification change by a user of the system. Optionally, said controller is adapted to receive said specification change in functional terms.

In an exemplary embodiment of the invention, said controller downloads said database from a remote computer.

There is also provided in accordance with an exemplary embodiment of the invention, a self-configuring system, comprising:

a plurality of robotics components, at least some of which are interconnected by wires;

a database including system components specifications; and a controller that analyzes said database and reconfigures at least one of said interconnected components to interface with at least one of said wires differently, to achieve a desired system configuration. Optionally, said interface is reconfigured, so that at least one wire carries a different signal type than before the reconfiguration. Alternatively or additionally, said interface is reconfigured, so that at least one wire carries a different signal amplitude than before the reconfiguration. Alternatively or additionally, said interface is reconfigured, so that at least one wire carries a different signal rate. Alternatively or additionally, the system comprises an input that receives a user system specification and wherein said controller changes said configuration in response to a user request. Alternatively or additionally, said controller changes said configuration in response to a failure in the system.

There is also provided in accordance with an exemplary embodiment of the invention, a switch emulator, comprising:

a connection to a motor;

a connection to a driver; and an input for selecting whether said emulator maintains an overload switch in said motor in a normally open or a normally closed position.

BRIEF DESCRIPTION OF THE DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements or parts which appear in more than one figure are preferably labeled with a same or similar number in all the figures in which they appear, in which.

DETAILED DESCRIPTION OF SOME EMBODIMENTS OF THE INVENTION

Figure 1:
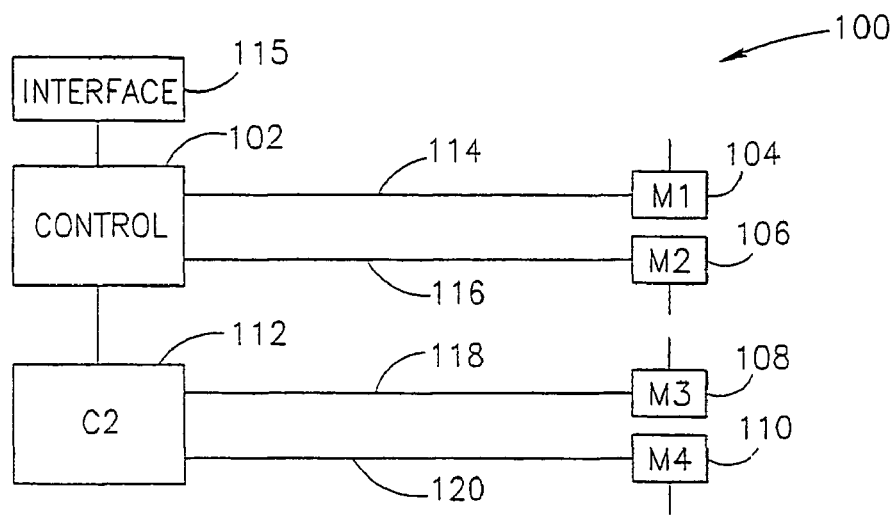
FIG. 1 is a schematic block diagram of a multi-module system in accordance with one embodiment of the invention.

FIG. 1 is a schematic block diagram of a multi-module system 100 in accordance with one embodiment of the invention. The exemplary system shown includes a control unit 102, that controls and/or powers a first motor 104 and a second motor 106. A secondary control unit 112, controlled by unit 102, controls and/or powers a third motor 108 and a fourth motor 110. Optionally, power supply is separate from the control, for example being provided by different units. Cables 114, 116, 118 and 120, connect motors 104, 106, 108 and 110, respectively to their controllers.

In an exemplary embodiment of the invention, the cables are connected using plugs. In one embodiment of the invention each plug can only be connected in one way, with each pin having a pre-defined function. Thus; errors in pin assignment and/or pin cross-connections are prevented. Alternatively or additionally, the modules, for example the controller modules and/or motor modules include circuitry for pin identification and assignment. In one example, during system start up the plug circuitry checks the pin assignment and/or reassign the pins to the desired control and/or power signals. Pin reassignment may, for example, utilize solid state switches and/or electrically actuated mechanical switches.

Alternatively or additionally to plug connections configuration, system 100 automatically detects drive rotation direction and/or corrects the rotation direction. Apparently, rotation direction is difficult to determine prior to integration and forms a major problem in integration.

Alternatively or additionally to using dedicated lines, a general bus, such as a VME bus, may be used.

Optionally, a user interface 115 is provided, for example to allow a user to enter information and/or commands, review system information and/or respond to system queries.

In another exemplary configuration, each motor is associated with a driver, which driver receives feedback from a machine and provides driving signals to the motor. A controller, which may be shared by several drivers, controls the action of the motors. The controllers may be connected to a host computer, for example for programming. In some embodiments, feedback is from the motor and/or is provided to the controller or the host. In the previously described embodiment of FIG. 1, the controllers and drivers were integrated into a singe element "controller" 112, but the driver may also be integrated with the motor, for example as described below. As can be appreciated, in different embodiments, different ones of the elements may be integrated and/or provided in a single enclosure.

Figure 2:
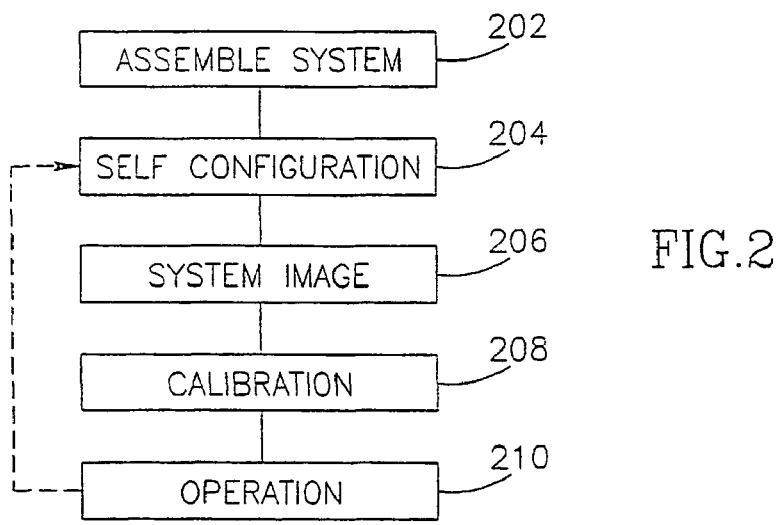
FIG. 2 is a flowchart of a method of assisted system assembly, in accordance with an exemplary embodiment of the invention.

FIG. 2 is a flowchart 200 of a method of assisted system assembly, in accordance with an exemplary embodiment of the invention.

At 202, system 100 is assembled, for example using plugs and fittings that allow only correct connections. In some cases, only a single system layout is possible using the provided components. Alternatively, a user can select among several system designs, with the component design only preventing illegal connections (e.g., power signals to control signal). Alternatively or additionally, the system assists a user in selecting a most appropriate unit for his needs. For example, system 100 may use a user input that defines a system requirement or behavior, to rule out certain units or to suggest lower quality units where possible.

At 204, an optional self configuration process is performed, in which system 100 detects all the components, and, if an automated pin assignment circuitry is provided, assigns functions to pins for the cables and the control boxes.

In one exemplary embodiment of the invention, a user can select from a wide range (all or part) of commercially available system components. The type and/or at least some properties of the system components are automatically detected and/or entered manually (described below). Alternatively, the system may prompt a user to perform certain diagnostic actions, so that the type and/or properties of the components can be determined from their response to the action(s).

Alternatively, some or all of the system components (e.g., controllers, power supplies and cables) are provided with a degree of intelligence. This intelligence may be utilized, for example, for one or more of the following uses:

(a) self-configuring of physical and/or logical connections between elements;
(b) performing certain actions on unusual input, for example stopping motor motion on illegal input or generating a visual alert (e.g., via one of the modules or a controlling computer);
(c) predicting future problematic activities, based on input and/or current status;
(d) performing synchronized, linear interpolation, circular interpolation and/or other types of moves;
(e) performing local housekeeping tasks, such as reset and self testing, for the same component or for "stupid" components connected to it;
(d) interacting with other smart elements to provided distributed control, for example different components comparing their failure rates, e.g., so as to detect possible design and/or implementation problems;
(e) generating a system view, e.g., the system configuration and/or abilities and, optionally, using such a view, for example, to alert a user to bad commands (e.g., cannot or should not be carried out), to generate and/or maintain a system component map, to alert for possible future failures and/or for communication with a host computer;
(f) allow programmability, for example to allow the host computer to recognize more components and/or to allow reprogramming of the components. Optionally the updates are downloaded from a communication network, for example an Internet, possibly automatically;
(g) assisting in system upgrade, for example, suggesting suitable upgrade options or translating user requests into a list (or several options thereof) of suitable replacement parts; and
(h) learning the system's ability and/or failure modes and/or instruct parameter limits.

The learning and/or intelligent behavior ability of the system may be provided using components known in the art, for example, example based learning, rule based learning, neural network learning and other learning method known in the art. Alternatively or additionally, a database of rules, specifications, cause-effect rules and/or translations between user input and technical specifications, is provided. Updates to the database may be based on the system experience and/or may be downloaded. Alternatively or additionally, other intelligent software components, as known in the art, may be used.

The system controller is optionally a complete controller including, for example, motion control, discrete I/O control, serial ports control and a software sequencer.

At 206, a user inputs into the system a "system image" which represents one or more functions expected from the system. As a result of the system image, various adjustments may be made to the system, for example, the rotation direction of drive motors may be changed, so that the system will perform coherently.

Alternatively or additionally, at 208, calibration may be performed, for example, a user testing to see which direction the motors turn and setting up system parameters to have a desired effect. Optionally, system 100 directs the user to perform certain tests and/or make certain decision regarding the functionality of system 100. In a particular embodiment of the invention, the system queries the user for the direction of rotation of a motor.

Once calibration is completed, system 100 may be used (210). Optionally, some or all of steps 204–208 are performed each time system 100 is turned on, for example to support module replacement, removal and/or addition.

Alternatively or additionally to system 100 guiding or otherwise supporting the integration, system 100 may be connected by computer communications to a remote guiding computer, for example via an Internet or a dial-up connection. Thus, the expertise of system configuration may remain at a central office. In some embodiments of the invention, system 100 is designed to have limited functionality. Information regarding the limited functionality may be associated with system 100, to assist in calibration and/or testing of the system.

System 10 may include one or more safety features, for example, limit switches at a driver level of the units; normally closed limit switches; and/or watchdog timers in the controllers, to hold motor movement when a controlling host computer or PLC would be found unguarded.

Figure 3:
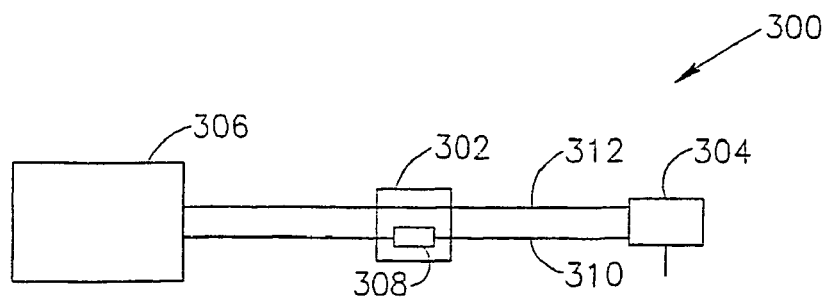
FIG. 3 is a schematic block diagram of the use of a limit switch converter box, in accordance with an exemplary embodiment of the invention.

FIG. 3 is a schematic block diagram of the use of a limit switch converter box 302, in accordance with an exemplary embodiment of the invention. It should be noted that such a limit switch converter box is an example of a modular unit designed to assist integration.

In a configuration 300, a controller 306 is connected to a motor 304 that includes a limit switch. As is well known, different countries have different standards for limit switches. In some countries, the limit switches are normally open. In other countries, the limit switches are normally closed. When building a system, it is desirable not to be limited to a particular type of switching logic.

Converter 302 includes a limit switch emulator 308. Power signals are transmitted as is over a cable 312. Signals from a limit switch are passed via a cable 310 to limit switch emulator 308. In some embodiments of the invention, cable 310 includes a control signal indicating the type of limit switch logic on motor 304.

Figure 4A:
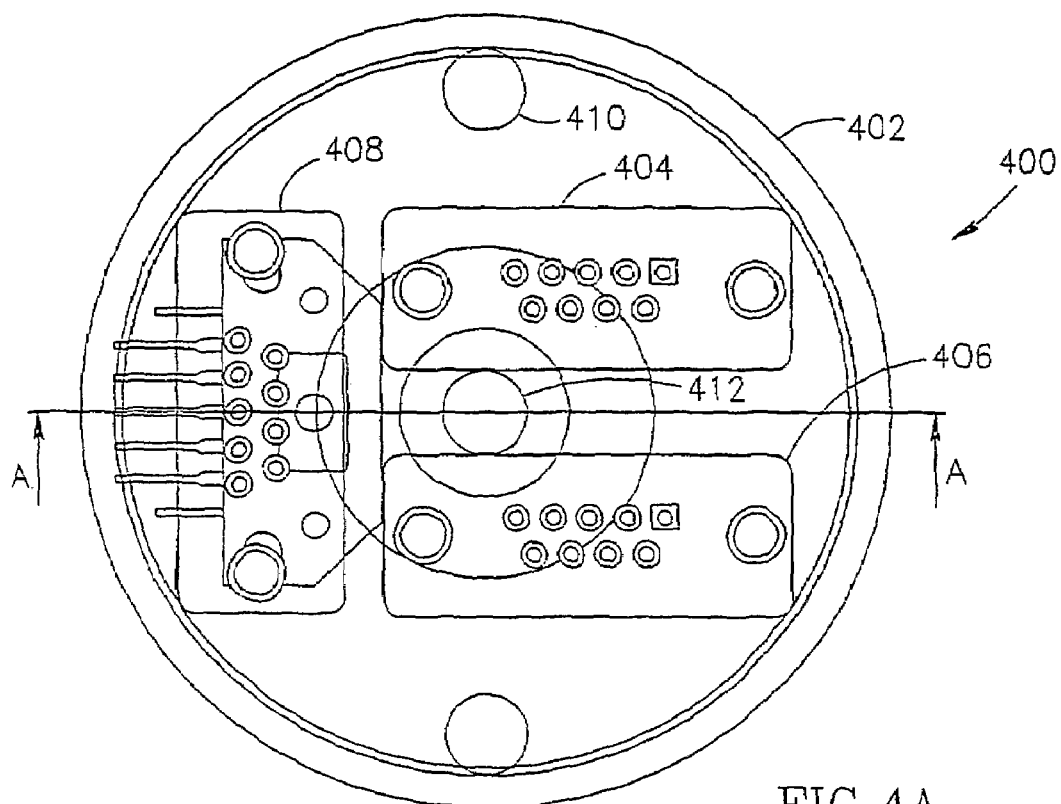
FIGS. 4A and 4D are top and side views of an integrated engine control module, in accordance with an exemplary embodiment of the invention.
Figure 4B:
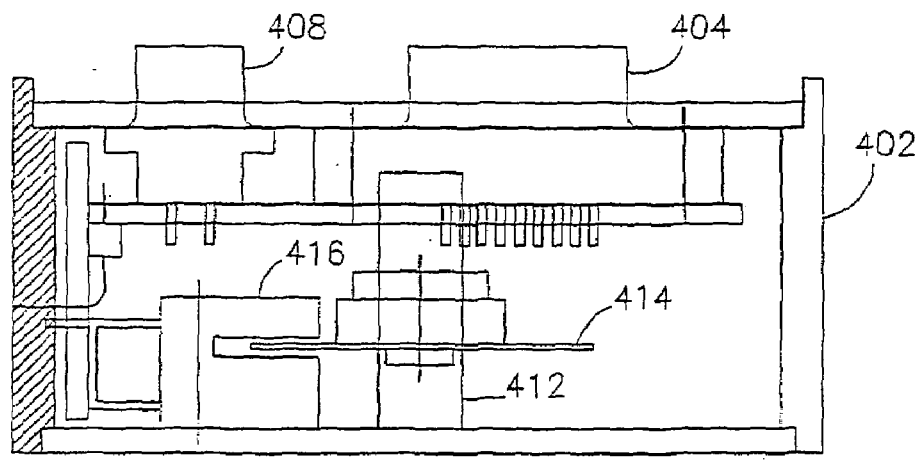

FIGS. 4A and 4B are top and side views of an integrated engine control module 400, in accordance with an exemplary embodiment of the invention. Such an engine control module may be fitted on the engine itself, and may include for example, a position encoder or rotation counter, a switch emulator, a controller, a driver and/or intelligence (e.g., an integrated circuit), as described above.

FIG. 4A is a top wire-frame view of an exemplary module 400, including a casing 402, for example made of plastic. A plurality of connectors 404, 406 and 408, type D9 in this example, are provided on the type of casing 402. Such connectors may be alternatively or additionally be mounted on the side of the casing. One or more screws 410 may be provided to attach module 400 to the motor (not shown). Reference 412 indicates a motor shaft or a receptacle for a motor shaft.

FIG. 4B shows a view from line A—A in FIG. 4A. A disc 414 and a sensor 416 are provided to supply optical position encoding. An integrated circuit (not shown) may also be provided.

Connectors 404, 406 and 408, may be used, for example for position output, power and control signals, respectfully. The control signal may be analog signals and/or digital signals. In an exemplary embodiment of the invention, module 400 includes an IC, for example an ASIC or a small circuit, for storing data and/or answering queries, for example re configuration. In an exemplary embodiment of the invention, modules 400 communicate using a packet switched network, however, other network type s may be used.

It should be appreciated that the above-described embodiments contain many features, not all of which need be practiced in all embodiments of the invention. Rather, various embodiments of the invention will utilize only some of the above described techniques, features or methods and/or combinations thereof. Further in addition, various modifications will be readily apparent to and may be readily accomplished by persons skilled in the art without departing from the spirit and the scope of the above teachings.

The present invention has been described in terms of exemplary, non-limiting embodiments thereof. It should be understood that features described with respect to one embodiment may be used with other embodiments and that not all embodiments of the invention have all of the features shown in a particular figure. Although some preferred embodiments may have been described only as method, the scope of the invention includes software and/or hardware required to perform the methods, typically an embedded computer. Additionally, the scope of the invention includes diskettes, CDs and/or other computer storage media including thereon representations of software suitable for carrying out at least one embodiment of the present invention. In particular, the scope of the invention is not defined by the preferred embodiments but by the following claims. When used in the following claims, the terms "comprises", "comprising", "includes", "including" or the like mean "including but not limited to".

The invention claimed is:

1. A self-predicting system, comprising:
a plurality of robotics components;
a memory staring therein a system configuration map; and
an input for a command to the system; and
a controller that receives at least one command from said input and that analyzes said command in view of said map, to predict a possible failure mode of the robotics system;
wherein said controller determines said failure mode based on at least one of initial speed final speed and acceleration of at least one of said components.

2. A system according to claim 1, wherein said controller comprises a database of failure scenarios and wherein said controller utilizes said database for said analysis.

3. A system according to claim 1, wherein said controller comprises a database of experience, learned by said controller in the use of said system and wherein said controller utilizes said database for said prediction.

4. A system according to claim 1, wherein said controller is a centralized component.

5. A system according to claim 1, wherein said controller comprises a plurality of controller components distributed between at least some of said components.

6. A self-predicting system, comprising:
a plurality of robotics components;
a memory storing therein a system configuration map; and
an input for a command to the system; and
a controller that receives at least one command from said input and tat analyzes said command in view of said map, to predict a possible failure mode of the systeim system;
wherein said controller determines said failure mode based on at least one of initial speed, final speed and acceleration of at least one of said components.

7. A system according to claim 6, wherein said controller comprises a database of failure scenarios and wherein said controller utilizes said database for said analysis.

8. A system according to claim 6, wherein said controller comprises a database of experience, learned by said controller in the use of said system and wherein said controller utilizes said database for said prediction.

9. A system according to claim 6, wherein said controller is a centralized component.

10. A system according to claim 6, wherein said controller comprises a plurality of controller components distributed between at least some of said components.

11. A system according to claim 6 wherein said input is a command from a user for the system to perform an act.

* * * * *